Figure 1:
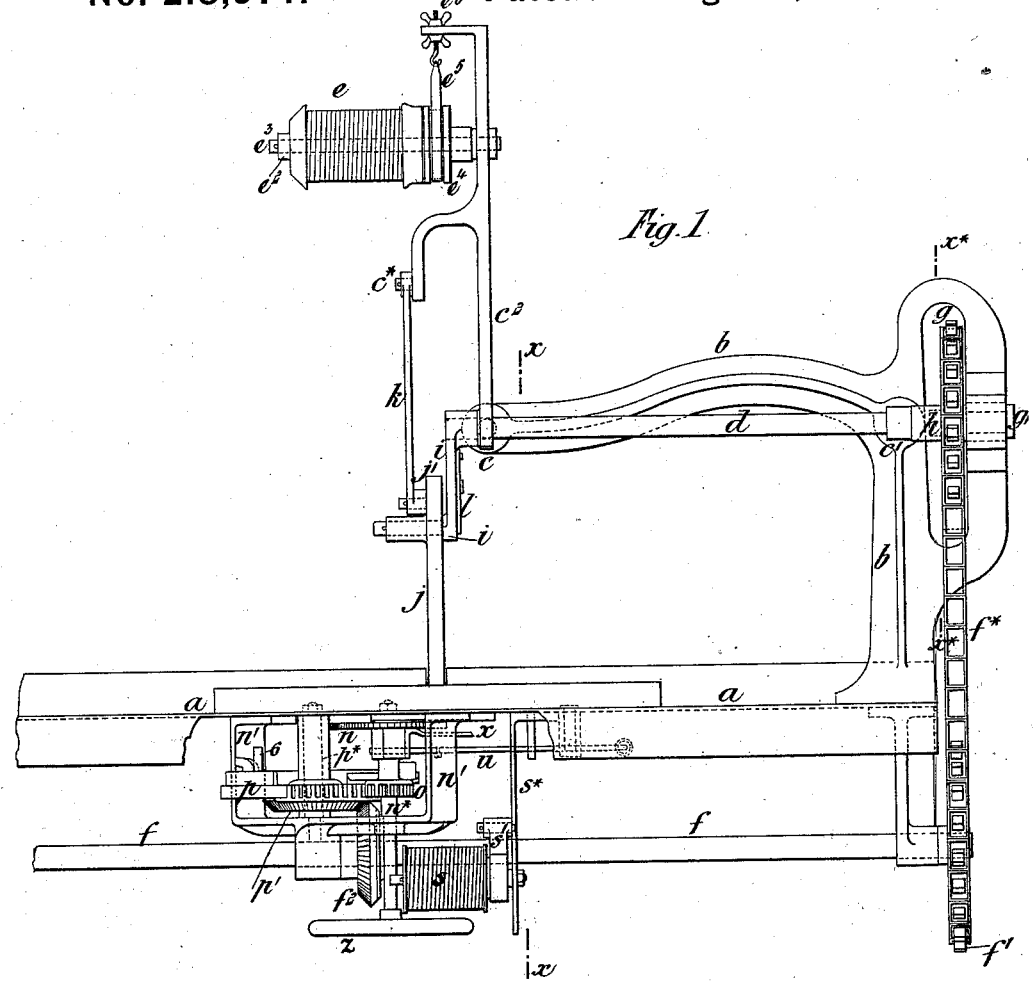

6 Sheets—Sheet 1.

J. HOWARD & E. T. BOUSFIELD.
Grain-Binder.

No. 218,974. Patented Aug. 26, 1879.

Witnesses:
Floyd Norris
N. P. Cowl

Inventors:
James Howard
Edward T. Bousfield
by Johnson & Johnson
Attys.

J. HOWARD & E. T. BOUSFIELD.
Grain-Binder.
No. 218,974. Patented Aug. 26, 1879.
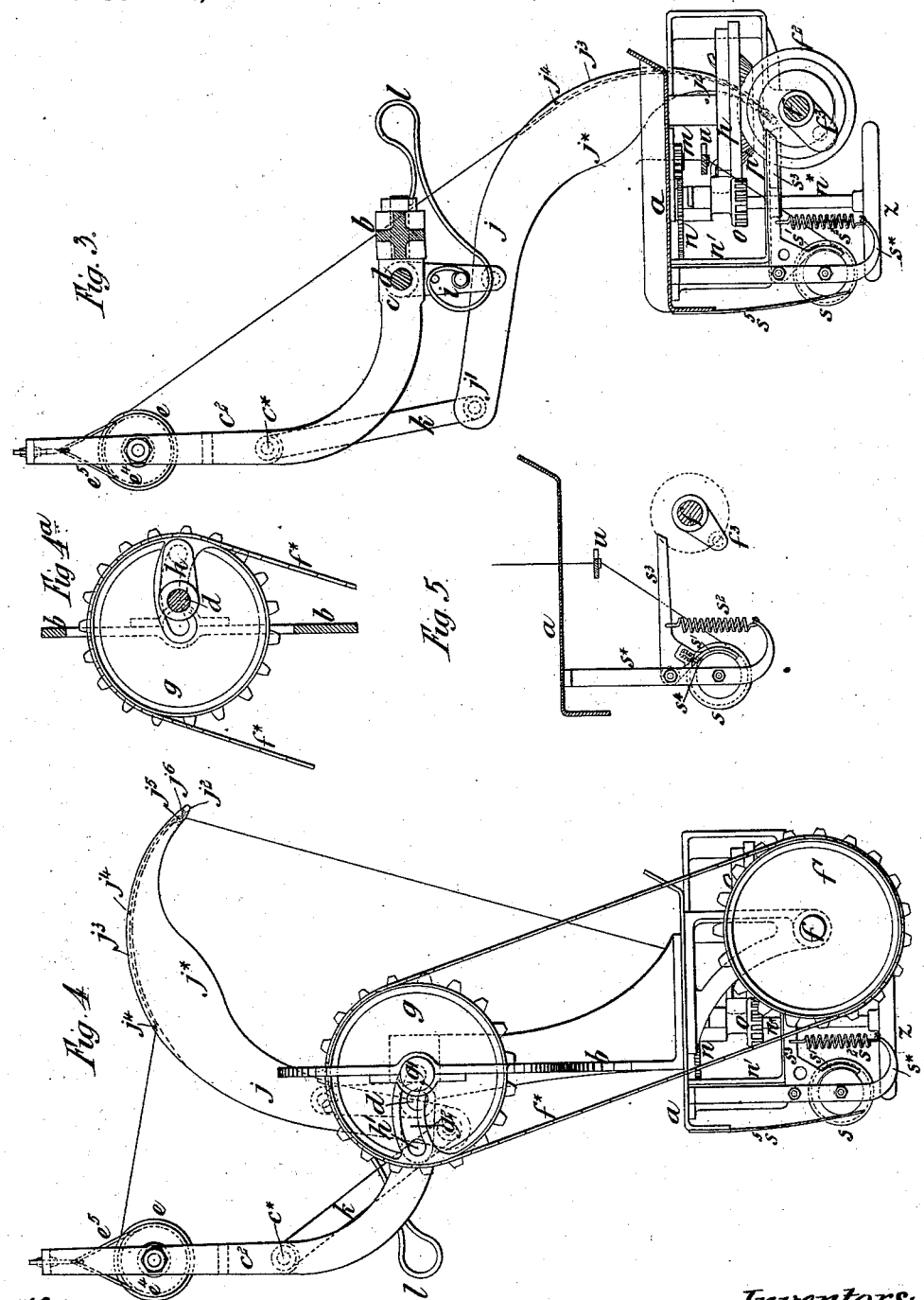
Witnesses:
Floyd Norris
D. P. Cowl
Inventors:
James Howard
Edward T. Bousfield
by Johnson & Johnson
Attys 6 Sheets—Sheet 3.

J. HOWARD & E. T. BOUSFIELD.
Grain-Binder.

No. 218,974. Patented Aug. 26, 1879.

Witnesses:
Floyd Norris.
D. P. Cowl.

Inventors:
James Howard
Edward T. Bousfield
by Johnson & Johnson
Atty.

6 Sheets—Sheet 4.
J. HOWARD & E. T. BOUSFIELD.
Grain-Binder.
No. 218,974. Patented Aug. 26, 1879.
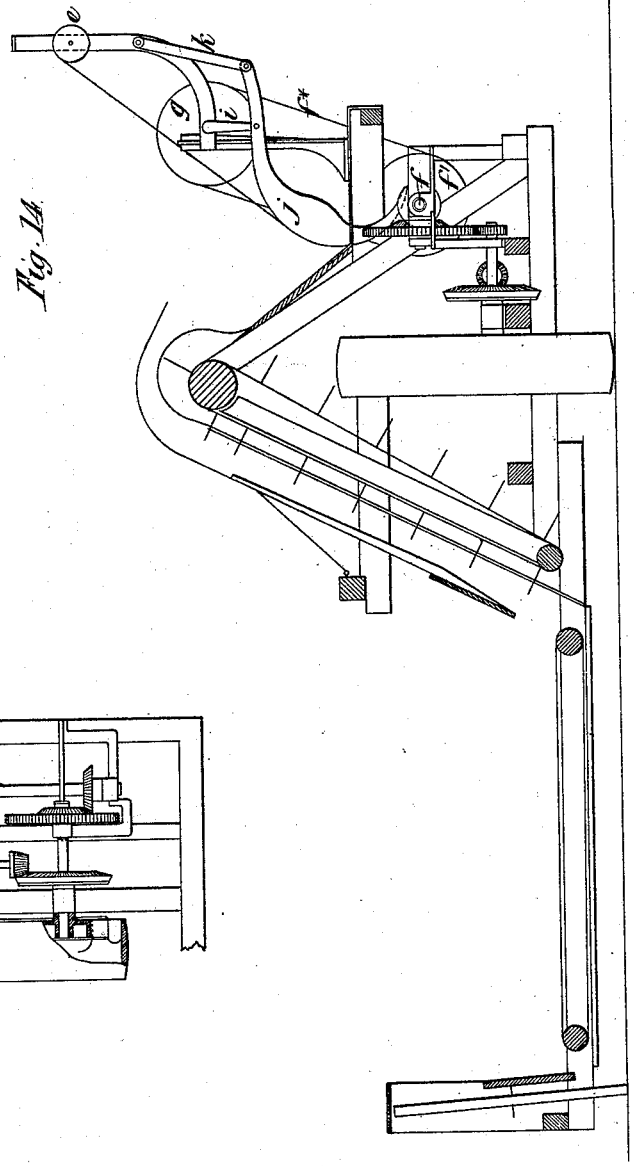
Witnesses:
Floyd Norris
D. P. Cowl
Inventors:
James Howard
Edward T. Bousfield
by Johnson & Johnson
Attys.

6 Sheets—Sheet 5.
J. HOWARD & E. T. BOUSFIELD.
Grain-Binder
No. 218,974. Patented Aug. 26, 1879.
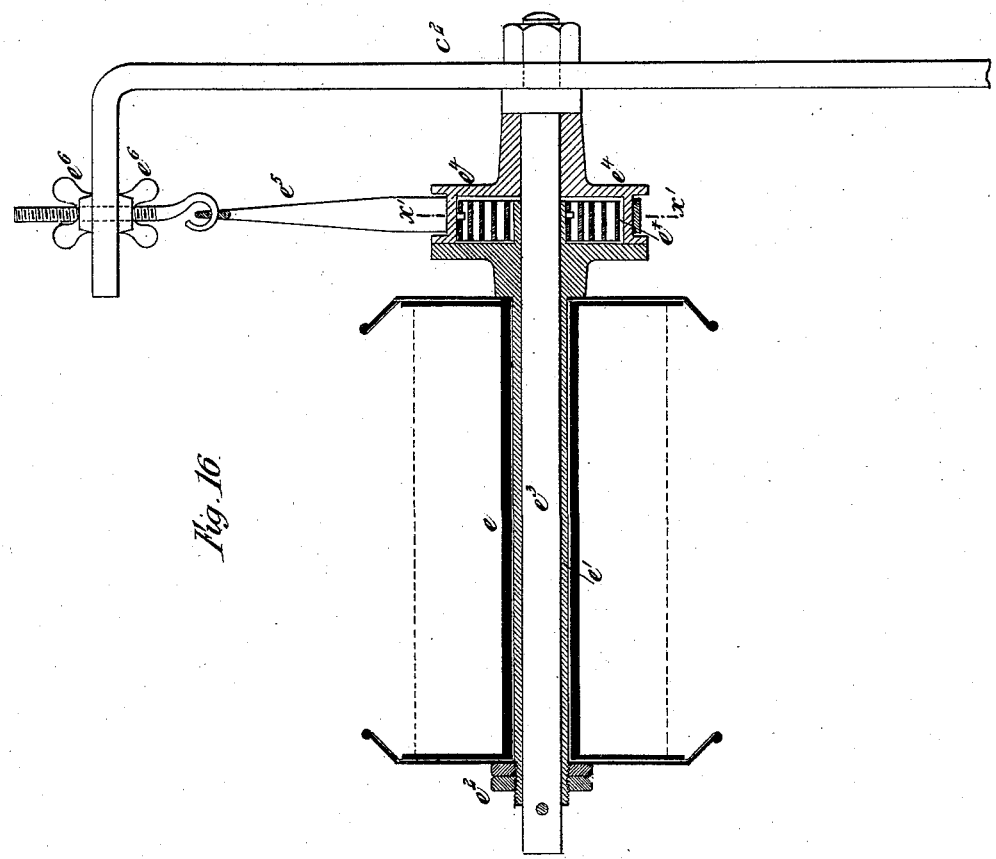
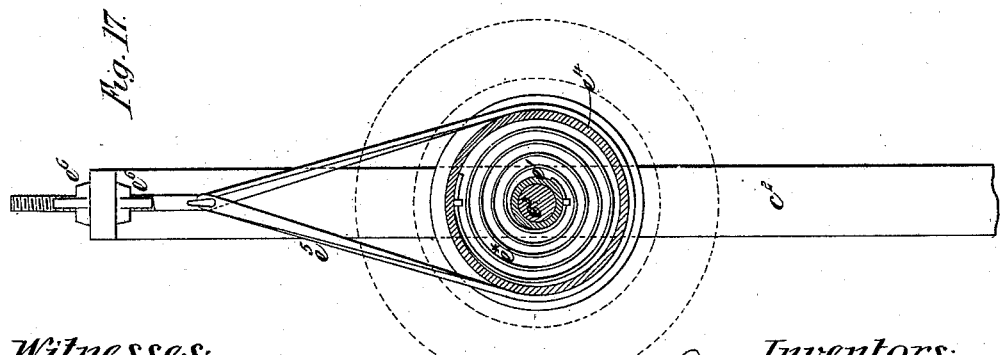
Witnesses:
Floyd Norris
D. P. Cowl
Inventors:
James Howard
Edward T. Bousfield
by Johnson & Johnson
Attys 6 Sheets—Sheet 6.

J. HOWARD & E. T. BOUSFIELD.
Grain-Binder.

No. 218,974. Patented Aug. 26, 1879.

Witnesses:
Floyd Norris
D. P. Cowl

Inventors:
James Howard
Edward T. Bousfield
by Johnson and Johnson
Attys

UNITED STATES PATENT OFFICE.

JAMES HOWARD AND EDWARD T. BOUSFIELD, OF BEDFORD, BEDFORD COUNTY, ENGLAND.

IMPROVEMENT IN GRAIN-BINDERS.

Specification forming part of Letters Patent No. 218,974, dated August 26, 1879; application filed June 3, 1879; patented in England, September 20, 1878.

*To all whom it may concern:*

Be it known that we, JAMES HOWARD and EDWARD TENNEY BOUSFIELD, both of Bedford, England, have invented new and useful Improvements in Sheaf-Binding Mechanisms, chiefly designed to be used as an attachment to a reaping-machine, of which the following is a specification.

Our invention relates to improvements in mechanism or apparatus chiefly designed to be attached to a reaping or harvesting machine for automatically separating the corn or grain deposited on the sheaf-table of the said machine into sheaves or bundles, and binding and securing the same with wire or other suitable material, but which apparatus may also be arranged to operate as an independent or separate sheaf-binding machine, to gather up and bind the grain or corn after the same has been cut by a harvesting-machine or otherwise.

The objects of the said invention are simplicity of construction combined with efficiency in operation and diminished liability to derangement of the parts of such machines.

Our invention is carried into practice in the following manner—that is to say, we provide the machine with a sheaf-table, upon which the corn or grain is delivered from the platform in any convenient manner, and which is adjustable lengthwise to permit the band or wire to be placed around the sheaves in any desired part or position of the same; but when the machine is in operation the said table is stationary—that is to say, it has no reciprocating or other movement on the frame of the machine for the purpose of collecting or separating the grain or crop into quantities to form the sheaves or bundles. We effect this separation of the grain by the action of a binding or binder-arm operating in a peculiar manner, as hereinafter set forth. This arm has its fulcrum on the pin of a crank fixed on the extremity of a shaft which rotates in suitable bearings in a standard or bracket attached to the said sheaf-table.

For effecting the removal of the bound sheaves from the table, we prefer to attach to the said crank a pusher or delivering-arm. We also provide the said machine with an improved twisting device, which is a peculiarly-formed whirl or pinion, flanged on its upper side, and supported with a capability of free rotation by its flange in a grooved or recessed plate attached to the sheaf-table, the said whirl being arranged in combination with a revolving knife or cutter, as hereinafter set forth.

Our invention is illustrated in the accompanying drawings, in which—

Figure 2:
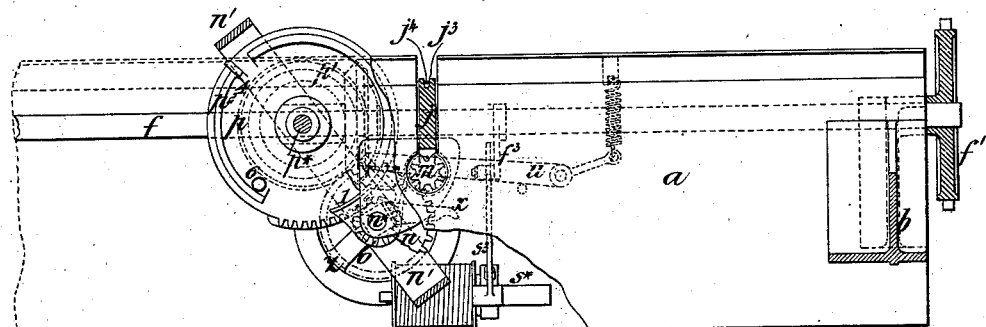
Figure 6:
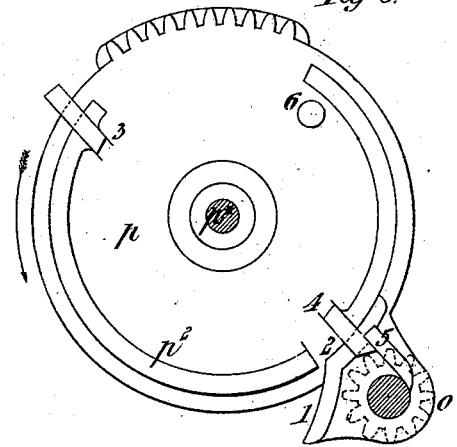
Figure 7:
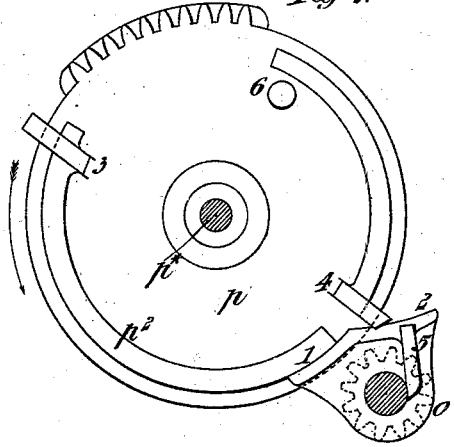
Figure 8:
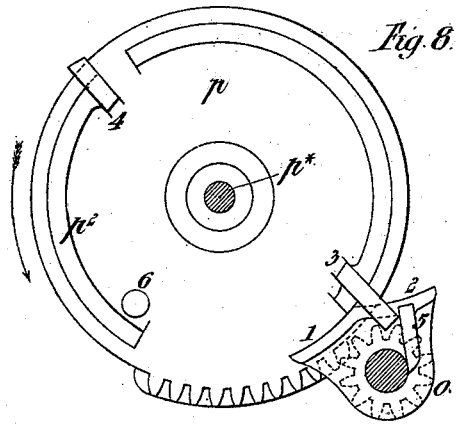
Figure 9:
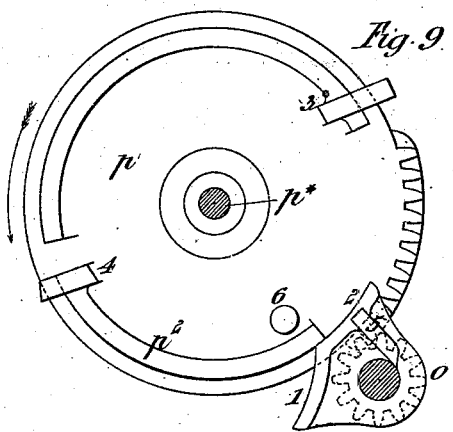
Figure 10:
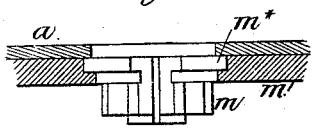

Figure 1 is a front elevation of our improved sheaf-binding mechanism. Fig. 2 is a plan or top view, partly in section, and with a portion of the sheaf-table broken away to show the mechanism below the same. Fig. 3 is an end elevation, partly in transverse section on the line $x\ x$, and showing the binder-arm in the same position as in Fig. 1. Fig. 4 is an end elevation, showing the binder-arm in its highest position. Fig. 5 is an end elevation, partly in transverse section, of a portion of the said mechanism slightly modified. Figs. 6 to 13 illustrate the mechanism for operating the twisting device.

The other figures show detached portions and modifications of our invention, and are hereinafter described.

Like letters indicate corresponding parts throughout the drawings.

$a$ is the foundation-plate of the binding mechanism, and forms the sheaf-table, upon which the grain falls from the elevators. Fixed on this table is the bracket or standard $b$, which carries the binding arm or needle and the upper bobbin, while the mechanism for driving the said binding-arm and the twisting and cutting devices are arranged under the said table.

The bracket $b$ extends over the table, as shown, in such a manner as to allow a clear space for the grain to pass under it. This bracket carries in suitable bearings $c\ c^1$ a shaft, $d$.

The bearing $c$ has extended from it an arm, $c^2$, carrying the upper bobbin, $e$.

The shaft $d$ receives motion from the shaft $f$, below the table, through the chain or pitch wheel $f^1$ on the shaft $f$, the pitch-chain $f^*$, which passes around the said wheel, and the chain-wheel $g$.

The shaft $f$ is driven through suitable gearing from the main driving-wheel of the machine, as shown in Figs. 14 and 15, Fig. 14 being a sectional elevation drawn to a reduced scale, and Fig. 15 a plan of the portions of the said machine.

To insure the most satisfactory results in the working of our improved binding mechanism, it is necessary to impart to the binder-arm a peculiar varying or differential motion—that is to say, it should move quickly in placing the wire around the sheaf, and should pause or remain stationary, or nearly so, during the operation of the twisting and cutting mechanism, and should then rise quickly to draw up the wire for a fresh sheaf.

This peculiar movement of the binder-arm may be imparted to it by various devices or arrangements; but we prefer to use the arrangement illustrated in the drawings, and which we will now describe.

The pitch or chain wheel $g$ is not fixed or mounted upon the shaft $d$, but upon a short shaft or journal, $g^1$, fitted to turn independently of and eccentrically to the said shaft in a bearing in the bracket $b$. This wheel communicates motion to the said shaft through the intervention of a crank, $h$, keyed on the latter, the pin $h'$, Fig. 4, of which crank works in the slot $g^2$ in the wheel $g$. The other end of the shaft $d$ carries a crank, $i$. The binding-arm $j$ has its fulcrum or pivot on the pin of this crank, and the end $j^1$ of the said arm is connected by a radius rod or link, $k$, to a fixed point, $c^*$, which may be any suitable part of the bracket or arm, as shown. This mechanism, consisting of the crank $i$ and radius-rod $k$, connected, as described, with the binding-arm $j$, causes the point or extremity $j^2$ of the said arm to move in the required path; and it will be readily understood that when this mechanism is combined with the slotted wheel $g$ and crank $h$, as shown, the eccentricity of the said wheel to the shaft $d$ will cause the speed of the latter to be varied, and, consequently, the binder-arm will move through its path with a varying or differential action, as above specified.

Fig. 4$^a$ is a section on the line $x^*$ $x^*$, Fig. 1.

The said binder-arm, on its inner edge, is preferably formed with a convexity or protuberance, $j^*$, which assists in compressing or holding the sheaves while the band is being passed around them. With this construction and arrangement of the said binding mechanism we are enabled to dispense with the separate jointed compressor or compressing bar or lever commonly employed, and the binder-arm is not encumbered with springs or other parts liable to derangement. This binding-arm has a groove, $j^3$, in its back for the wire from the upper bobbin, $e$, to lie in, and the wire is retained therein by small pins or guards, as shown at $j^4$. The free or pointed end $j^2$ of the binding-arm is, in some instances, furnished with two pulleys or rollers, $j^5$ $j^6$, for the purpose hereinafter described.

The spool or bobbin $e$ is provided with a take-up device. (Represented in Fig. 1, and shown detached and drawn to an enlarged scale in Figs. 16 and 17.) Fig. 16 is a longitudinal section, and Fig. 17 a transverse section on the line $x^1$ $x^1$, Fig. 16.

This take-up device is constructed and combined with the said spool or bobbin in the following manner—that is to say: The spool or reel $e$, upon which the binding-wire is wound, is firmly secured upon a sleeve, $e^1$, by the nuts $e^2$. The whole is free to revolve upon the spindle $e^3$, which is secured to the arm $c^2$ of the binding-arm bracket. $e^4$ is a box containing a spiral spring, $e^*$, also loose upon the spindle $e^3$. The said spring is attached by one end to the box $e^4$, and by the other end to the sleeve $e^1$. A brake-band, $c^5$, is passed around the box $e^4$, and is fixed to an adjustable hook at the top of the binding-arm bracket. This hook may be raised or lowered by means of the nuts $e^6$ to tighten or slacken the band, and thereby give the required tension to the binding-wire. When the wire is drawn from the said reel by the descent of the binder-arm $j$, the reel, with the sleeve $e^1$, to which it is firmly secured, revolves in the direction to give off the wire, and in this movement first coils up the spring. The further descent of the binder-arm revolves the spring-box $e^4$, around which is passed the adjustable friction-band $e^5$. As the binding-arm $j$ rises from the sheaf-table the slack of the wire is taken up by the uncoiling or opening of the spiral spring $e^*$, which then causes the wire-reel to rotate in the opposite direction.

Figure 12:
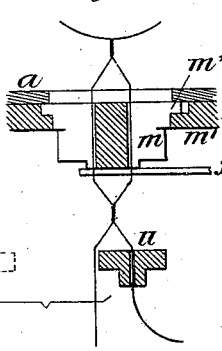
Figure 13:
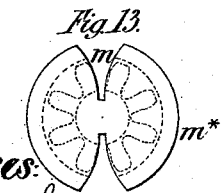

Attached to the crank $i$ is a delivery-arm, $l$, which assists to remove the bound sheaves from the table $a$. Below this table $a$ we arrange the twisting device and mechanism for operating the same. This twisting device consists of a flanged whirl or pinion, $m$, supported by its flange $m^*$ in an annular groove or recess in the plate $m'$, attached to the lower side of the table $a$, as clearly shown in Figs. 10, 11, and 12, which are sectional side elevations of the said whirl and adjacent parts. Fig. 13 is a plan or top view of the said whirl, these figures being drawn to an enlarged scale.

By this arrangement the said whirl is supported with a capability of free rotation clear of any obstruction below its support or bearing in the said plate.

Gearing with this whirl is a wheel, $n$, and on the shaft or spindle $n^*$ thereof is a pinion, $o$. This shaft or spindle is fitted to turn freely in bearings in the table $a$, and in a bracket, $n'$, pendent from the lower side of the said table.

Figs. 6 to 9 illustrate in detail the construction and arrangement of our apparatus for giving motion to the whirl.

Figs. 6, 7, 8, 9 are plans of the segmental rack and the pinion geared with the same. This segmental rack, which consists of a toothed arc or segment on the rim of the wheel $p$, has a continuous circular or rotary motion imparted to it from the shaft $f$ through the miter-wheel $f^2$, fixed on the said shaft, and which gears with a similar wheel, $p^1$, fixed or formed on the wheel $p$. and turning with the same on the stud or shaft $p^*$. The length of the said arc or segment is sufficient to give the required number of revolutions through the pinions $o$ and $n$ to the whirl $m$. On the upper surface of the wheel $p$ is a raised rim, $p^2$, which, however, does not extend along the toothed portion or segment of the said wheel. Upon the pinion $o$ is a flange or projection with two surfaces, 1 and 2, which fit against the aforesaid rim of the wheel $p$, and prevent the rotation of the pinion $o$ when the teeth of the segment are out of gear with the said pinion. The said wheel $p$ has on it two striking shoulders or lugs, 3 and 4, arranged to act upon a shoulder, 5, on the pinion $o$, as hereinafter described.

In this arrangement the wire-guide or carrier lever $u$ passes under the whirl, and conducts thereto the wire from the lower bobbin, and a striking pin or piece, 6, on the wheel $p$, at the proper moment pushes the said lever to one side of the whirl. The said lever is brought back to its normal position by an opposing spring.

Figure 19:
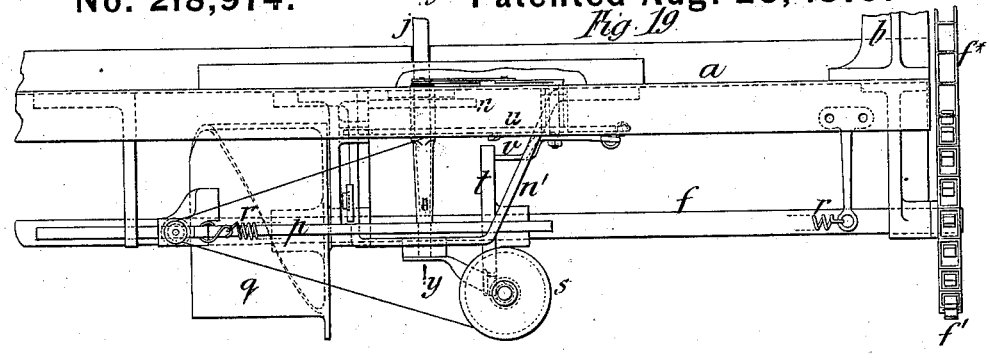
Figure 18:
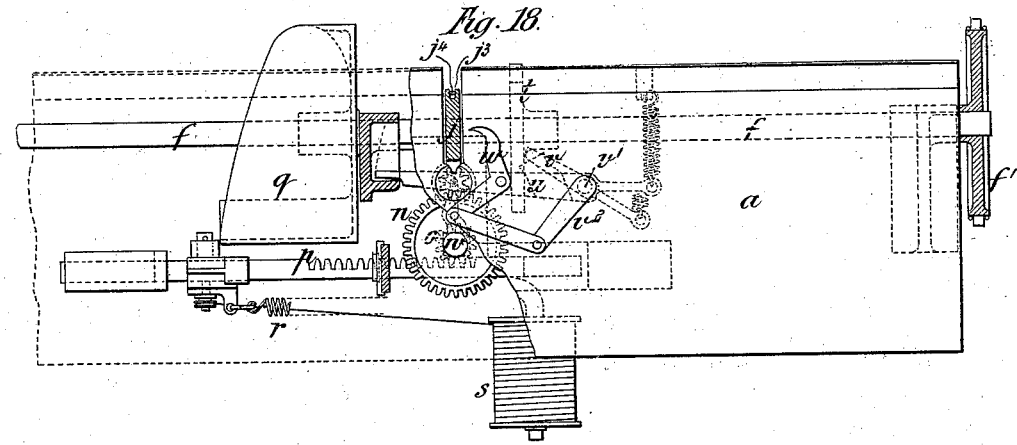
Figure 20:
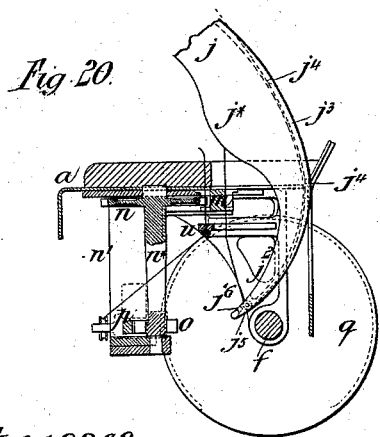
Figure 21:
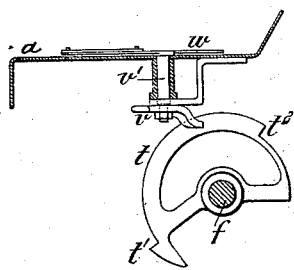

We may modify this apparatus by adopting the arrangement illustrated in Figs. 18, 19, 20, 21. Fig. 18 is a sectional plan of this arrangement of our apparatus. Fig. 19 is an elevation. Fig. 20 is an elevation, partly in transverse section, on the line $y\ y$, Fig. 19; and Fig. 21 is a transverse section of a portion of the said mechanism detached.

In this arrangement motion is given to the pinion $o$ by a straight reciprocating rack and a counteracting-spring—that is to say, the rack $p$ gears with the said pinion, and is moved in one direction by a revolving cam, $q$, on the shaft $f$, and in the opposite direction by the spring $r$; but we prefer to employ the rotary segmental rack.

It will be seen in Figs. 18 and 19 that the lower bobbin, $s$, is mounted in a convenient position below the table $a$. For bringing the wire into the proper position in relation to the whirl we fix a cam, $t$, on the shaft $f$, and arrange this cam in connection with the levers $u$ and $v$. One shoulder or projection, $t^1$, of this cam acts on the lever $u$, which is the guide or carrier of the wire from the lower spool. The other shoulder, $t^2$, of the said cam acts on the lever $v$, on the lower end of the spindle $v^1$, and thereby communicates motion from the lever $v^2$, on the upper end of this spindle, and through suitable connecting levers, to the lever $w$, immediately above the table, and which brings the upper wire to the whirl and insures its engaging properly with the same. This arrangement is clearly shown in Figs. 18 and 21.

We have found it very desirable to provide means for giving to the cutter $x$ considerable momentum or impetus at the moment when the wire is cut, and for this purpose we place on the shaft of the wheel $n$, whereon the said cutter is fixed, a small fly-wheel, $z$.

We have also found it desirable to employ, in combination with the lower bobbin or spool, $s$, an automatic intermittent brake, which will act to produce friction to prevent the rotation of the said spool except at the moment when the binder-arm rises, thereby insuring the proper quantity of wire being taken from the lower bobbin. For this purpose we employ the device shown in Figs. 1, 2, 3, 4, 5—that is to say, we arrange, in combination with the spool $s$, a curved arm, $s^1$, which is formed to bear upon a flange on the end of the said spool, and is kept in contact therewith by the spring $s^2$, attached by one end to the bracket $s^*$, and by its other end to the brake-lever $s^3$. This spring is regulated to exert sufficient pressure on the brake to prevent the accidental or too free uncoiling of the wire from the said spool except at the moment when the binder-arm rises, at which moment the arm $f^3$, Fig. 3, on the shaft $f$ strikes the brake-lever $s^3$ and raises the brake $s^1$ from the spool, thus allowing the wire to uncoil or run off freely from the spool to permit the required quantity to be taken therefrom. We prefer to combine with this intermittent brake means for obtaining a slight continuous pressure on the spool to prevent its accidentally giving off any of its wire when the brake $s^1$ is raised. For this purpose we employ a small spiral-spring presser, as shown at $s^4$, or a flat spring, as shown at $s^5$, arranged to bear on the spool, or any other suitable device.

In commencing to work with our improved binding mechanism the wire from the upper bobbin is threaded through the groove at the back of the binding-arm and passed over the roller or rollers at the extremity or point of the said arm, and by hand is twisted with the end of the wire from the lower bobbin, which wire has been previously passed up through the small hole in the guide-lever $u$, and through the slot or aperture in the table $a$. If the wheel or rack $p$ is now supposed to be in the position shown in Fig. 6, and the wire is engaged with the whirl in its notch nearest the point of the binding-arm, the further movement of the wheel $p$ causes the shoulder 4 to act against the shoulder 5 on the pinion $o$ and effect a partial revolution of the latter, bringing its concave face 1 against the rim of the wheel $p$, and turning the face 2 from the same, the pinion $o$ being then in the position shown in Fig. 7. These movements have the effect of turning the whirl through half a revolution, whereby its notch in which the wire is engaged is brought to the opposite side of its axis, or that side farthest from the point of the binding-arm as the latter approaches the whirl.

Figure 11:
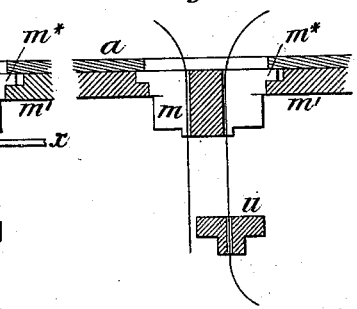

The said binding-arm now descends, incloses the sheaf, and passes the wire around the said sheaf to the whirl and into the other notch of the same, which is now in the position previously occupied by the first notch, and the wire will then be in the position shown in Fig. 11. During the descent of the binding-arm the wheel or segment $p$ has traveled to the position shown in Fig. 8 to engage with the pinion $o$, and during the pause or slow movement of the binder-arm, produced by the mechanism that operates the same, as above described, the said segment moves in gear with the said pinion, and thereby causes the whirl to rotate and twist the wire above and below the whirl, as shown in Fig. 12. At the moment when the twist is completed the cutter $x$, attached to and revolving with the shaft of the pinion $o$, passes under the whirl and severs the two wires, leaving the wires from the top and bottom bobbin united at the lower twist, ready to be drawn up when the binder-arm rises to recommence the above operations for binding the next sheaf.

It will be seen that the said lower twist is just above the upper side of the guide-lever $u$, the hole in which is too small to allow the twisted wire to pass through the same. As the binder-arm rises the stud 6 in the wheel $p$ strikes the lever $u$ and throws it into the position shown in dotted lines in Fig. 12. This movement of the said lever has the effect of drawing sufficient wire from the lower bobbin, $s$, to bring the lower twist above the whirl when the lever $u$ has returned to its normal position, the free movement of the bobbin at this moment being permitted by the brake $s^1$, as above described.

If the intermittent brake $s^1$ is not used in connection with the lower bobbin the aforesaid rollers in the extremity or point of the binding-arm will serve to bring the joined or intertwisted wires above the table and clear of the whirl. In this case the upper wire is passed over the small supplementary roller in the point of the binding-arm, and the angle thus formed in the upper wire causes sufficient friction or tension thereon to insure the requisite quantity of wire being taken from the lower bobbin.

When we desire to bind with a single wire in our improved mechanism, we dispense with the lower bobbin and the appliances connected therewith, as above described, and make use of a clip or clamping device constructed and arranged to secure the end of the wire to permit the loops of the same to be formed. This clip has two jaws. The upper jaw terminates in a hook, and is provided with a shoulder, against which the wire is cut. The lower jaw consists of a spring made concave to present an opening for the wire. This clip is arranged in combination with a finger which forces the wire into the whirl.

What we claim is—

1. The combination of parts consisting of the binding-arm $j$, pivoted on a crank, $i$, above the sheaf-table $a$, and connected by a link, $k$, to a fixed stud, the shaft $d$, the crank $h$, and the slotted chain-wheel $g$, whose axis is eccentric to the said shaft, all arranged and operating substantially as set forth, whereby the said crank is caused to impart to the binding-arm its peculiar differential movement, as and for the purpose above specified.

2. The chain-wheel $g$, mounted upon a short journal and having a slot, $g^2$, and the crank $h$ of the binder-operating shaft, having a pin, $h'$, adapted to work freely in the said slotted wheel, in combination with mechanism for connecting and driving the binder-arm shaft from the main driving-shaft through the said slot-and-crank connection, substantially as herein set forth.

3. The segmental rack-wheel $p$, having the raised segmental rim $p^2$ and the shoulders or lugs 3 and 4, in combination with the wire-twisting device and its operating pinion $o$, having a double concave bearing, 1 and 2, and a shoulder, 5, adapted to receive the action of the wheel-lugs, whereby to effect the partial revolution of the pinion to bring the said bearing concaves in position as locks upon the rack-wheel rim to prevent the rotation of the said pinion and of the twisting-whirl when the rack of said wheel is out of gear.

4. The wire-severing cutter $x$, arranged upon an independent shaft, $n^*$, which carries the pinion $o$, which gears with the twisting-whirl gear $m$, in combination with a fly-wheel, $z$, upon said shaft, whereby to cause said cutter to have a considerable momentum or impetus at the moment of severing the twisted wire, substantially as herein set forth.

5. The combination of the said binder-arm $j$ and its operative mechanism, the whirl $m$, cutter $x$, and the wire-guide or carrying-lever $u$, substantially as described and shown, and for the purpose specified.

6. The push or delivery arm $l$, in combination with the binder-arm and its operating crank $i$, to which said push-arm is connected, whereby to assist in removing the bound sheaf from the table, substantially as herein set forth.

7. The combination of parts comprising the said whirl $m$, the segmental rack $p$, and gearing for driving the same from or by the shaft $f$, the rotating cutter $x$, and the wire-guide lever $u$, arranged substantially as described and shown, and operating as and for the purpose specified.

8. The brake for the lower spool, $s$, consisting of the arm $s^3$, having the curved bearing end $s^1$, in combination with the arm $f^3$ on the main driving-shaft $f$, and the spring $s^2$, as shown and described.

9. The combination of parts comprising the segmental rack $p$, the pinion $o$, arranged to gear with the same, the whirl or twisting device $m$, the rotating cutter $x$, provided with a fly-wheel, $z$, the wire-guide lever $u$, and the intermittent brake $s^1$, applied to the spool $s$, all arranged as shown, and operating as and for the purposes specified.

10. The intermittent brake for the lower spool, $s$, consisting of the arm $s^3$, having the curved bearing $s^1$, the spring $s^2$, and the operating-arm $f^3$ on the main driving-shaft $f$, in combination with the supplemental spring for maintaining a slight continuous pressure on the spool, substantially as herein set forth.

JAMES HOWARD.
EDWARD TENNEY BOUSFIELD.

Witnesses:
J. F. NUTTER,
WM. B. TAYLOR.